United States Patent [19]

Gläser

[11] 4,396,133
[45] Aug. 2, 1983

[54] WAX CYLINDER

[75] Inventor: Georg Gläser, Dinslaken, Fed. Rep. of Germany

[73] Assignee: Thyssen Industrie AG, Fed. Rep. of Germany

[21] Appl. No.: 307,302

[22] Filed: Sep. 30, 1981

[30] Foreign Application Priority Data

Oct. 13, 1980 [DE] Fed. Rep. of Germany ....... 3038623

[51] Int. Cl.³ .............................................. B29F 1/00
[52] U.S. Cl. ................................... 222/334; 425/558; 425/559; 222/372
[58] Field of Search ............... 222/258, 259, 260, 261, 222/383, 309, 380, 334, 372; 425/558, 559

[56] References Cited

U.S. PATENT DOCUMENTS

| | | | |
|---|---|---|---|
| 3,797,984 | 3/1974 | Yago et al. ...................... | 425/548 X |
| 3,867,080 | 2/1975 | Bruder ............................... | 425/548 |
| 4,341,329 | 7/1982 | Kuemmerer et al. ........... | 222/380 X |

FOREIGN PATENT DOCUMENTS 1809657  6/1970  Fed. Rep. of Germany ........ 91/217

*Primary Examiner*—Joseph J. Rolla
*Assistant Examiner*—R. Stormer
*Attorney, Agent, or Firm*—McGlew and Tuttle

[57] ABSTRACT

A wax cylinder for a wax spraying machine is disclosed. The wax cylinder includes a housing, an ejection cylinder having a chamber mounted in the housing. An elongated piston is slidably mounted in the chamber and includes a pressure face for pressurizing and urging wax in the chamber out through an ejection opening. The chamber is maintained in constant fluid communication with a feed line for feeding wax into the chamber throughout the stroke of the piston. A check valve is utilized to prevent back flow of wax through the feed line. Air is prevented from flowing into the chamber during the return stroke of the piston.

11 Claims, 1 Drawing Figure

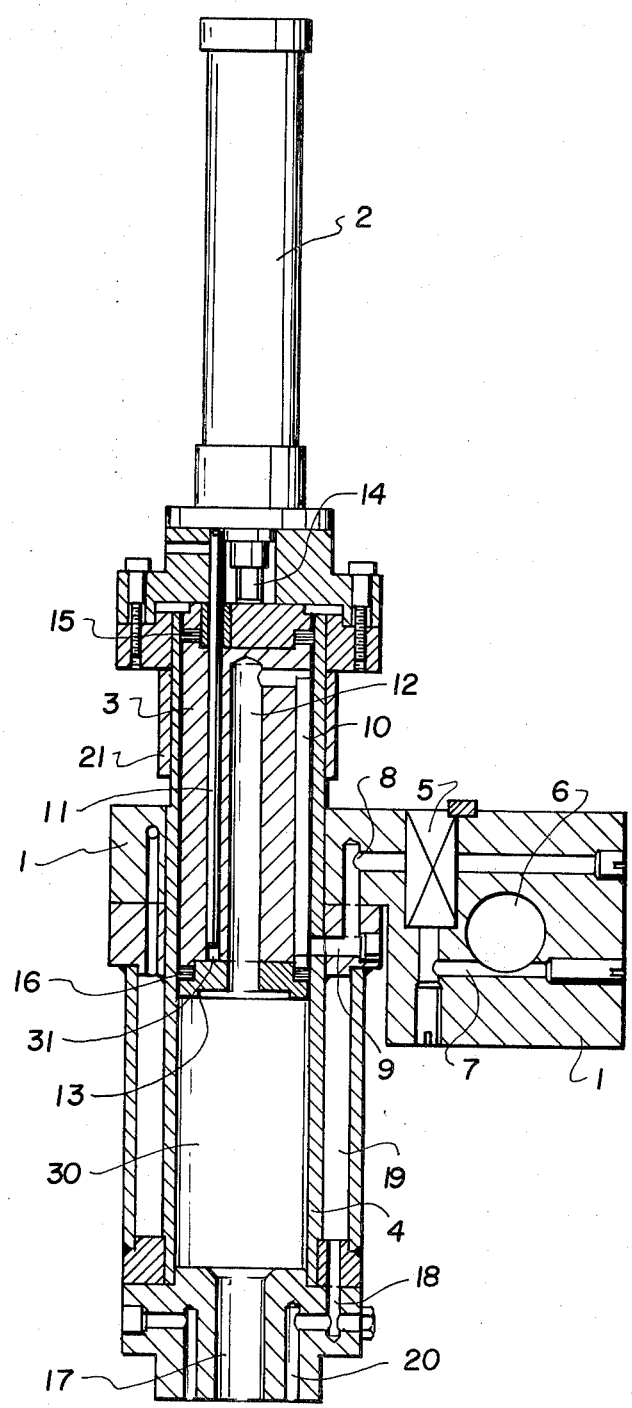

WAX CYLINDER

FIELD AND BACKGROUND OF THE INVENTION

The invention relates in general, to wax spraying machines and, more particularly, to a wax cylinder, composed of a housing having a displacement piston operated by a hydraulic cylinder in the ejection cylinder, for a wax spraying machine.

In known wax cylinders with displacement pistons, the wax supply occurs from the front of the wax cylinder through a flange cover in the region of the wax passage opening to a die. Only a part of the wax is pushed out of the cylinder space through the opening. For this reason, the cylinder must be fully evacuated from time to time as the wax quality may otherwise be diminished due to hardening or deposition of residues contained in the wax. The consequence of poor wax quality is increased spoilage in the spraying of wax parts.

SUMMARY OF THE INVENTION

The object of the invention is seen in developing a wax cylinder where retention in the ejection cylinder is prevented, thereby avoiding the aging of the wax, even during uninterrupted operation.

According to the invention, this problem is solved in a wax cylinder of the above mentioned kind which includes a housing, an ejection cylinder having a chamber mounted in said housing, an elongated piston slidably mounted in the chamber of the ejection cylinder and having a pressure face, the piston having a longitudinal groove substantially extending along the length thereof and a feed passage extending therethrough from a first end connected to the groove through a second end in said pressure face for communication with the ejection cylinder chamber, a feed line communicating with the longitudinal groove for passing wax in a feed direction through the housing and the ejection cylinder to the longitudinal groove, a check valve in the feed line for preventing the return flow of wax opposite the feed direction, means for preventing the rotation of the piston relative to the ejection cylinder in the chamber, means for ejecting wax from the chamber, and means for actuating longitudinal movement of the piston in the chamber to urge the pressure face into engagement with the wax in the chamber, the pressure face being operatively responsive to the actuating movement to pressurize the wax for ejection through the ejecting means. The supply of the wax travels through a feed line in the housing provided with a check valve, through a longitudinal groove in the displacement piston, and thence through an inlet line through the pressure face of the displacement piston causing the wax stream to flow always in one direction without backpressure areas during operation of the wax cylinder, thereby avoiding the retention of wax residues with the consequence of aging or deposition of additives. During extension of the hydraulic cylinder, its plunger pushes the displacement piston downward; return flow of the wax is prevented by the check valve and thus the ejection of the wax present in the ejection cylinder is made possible by the displacement piston. As the plunger of the hydraulic cylinder pulls back, fresh wax flows across the check valve, the feed line in the housing, and the groove moving along said line, the admission line in the displacement piston, and deposits just before the pressure face thereof, so that the next operative stroke the old wax is ejected and fresh wax is introduced to the pressure face during the return stroke.

Specifically the invention can advantageously be realized as follows. Since the displacement is mounted in an overhung position and, hence, is not firmly connected with the push rod of the hydraulic cylinder, the hydraulic cylinder can work only in ejection direction. Upon pull-back of the piston rod of the hydraulic cylinder, the displacement piston can be lifted only by the moving up of fresh wax thereby sucking back and avoiding the formation of hollow spaces in the wax so as to ensure a uniform flow.

Due to the facts that the stroke of the hydraulic cylinder is equal to the length of the ejection cylinder, and that the groove has the length of the displacement space and is arranged so that upon total displacement it is opposite the mouth of the feed line in the housing, and the total wax content of the ejection cylinder can be sprayed in one stroke and the ejection cylinder completely filled with wax during the return of the displacement piston.

The fixture of the displacement piston with respect to the angular position, so that the groove is always opposite the feed line in the housing, can be effected by a pin engaging a small distance into the groove from the housing or by an engaging feed line; in order to keep the flow channels free. However, it is advantageous to secure the displacement piston against rotation by a guide rod dipping in from above and fastened in the housing.

Two piston rings on the displacement piston at its upper and lower ends, at a distance such that during the total stroke they lie outside the feed line into the longitudinal groove, give additional assurance against issuance of small quantities of wax that could leak out despite the careful mutual adaptation of the inductively hardened and ground displacement piston and the honed ejection cylinder.

Thus, it is an object of the invention to provide a wax cylinder which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The sole drawing is a transverse section through a wax cylinder according to the invention.

DETAILED DESCRIPTION

The wax cylinder is composed of a housing 1 provided with a displacement piston 3 slidably received in a chamber 30 of an ejection cylinder 4 which is actuated by a hydraulic cylinder 2, and housing 1 is further provided with a check valve 5 and a feed line, designated by reference numerals 6,7,8 and 9. The feed line opens, at 9, into a longitudinal groove 10 formed in the displacement piston 3. The piston 3 is provided with a guide rod 11 extending into a guide opening 31 in piston 3 to secure the piston against rotation. A feed passage 12, connected to the longitudinal groove 10, discharges at the pressure face 13 of the displacement piston 3. A plunger 14 of the hydraulic cylinder 2 acts only in ejection direction which in the sole drawing means downwardly direction. The stroke of the hydraulic cylinder 2 is equivalent in length, that is the same length as the ejection cylinder 4. The longitudinal groove 10 likewise has the same length as the stroke length and is arranged so that it is in communication with the mouth of the feed line 9 in the housing through total displacement of piston 3. At the upper and lower ends the displacement piston has piston rings 15,16. The piston rings 15,16 are arranged so that they lie outside, that is, bound the feed line 9 and the interconnected longitudinal groove 10 during total displacement of piston 3.

The wax cylinder operates as follows. Wax at a fixed temperature is forced through the initial part of the feed line, central duct 6, through feed line 7, across check valve 5, and through feed lines 8 and 9, the longitudinal groove 10 and the line 12 into the ejection cylinder 4. At a predetermined point of the work cycle of the wax spraying machine, the pressure-adjustable hydraulic cylinder 2 is pressurized. The cylinder 2 actuates the overhung displacement piston 3 and pushes the volume of the wax to be sprayed from the ejection cylinder 4 through an injection nozzle 17 into the forming die on the wax spraying machine (not shown). During this operation the check valve 5 blocks back flow of the wax. Upon reversal of the hydraulic cylinder 2, the plunger 14 of the hydraulic cylinder 2, returns to the starting position without taking along the displacement piston 3. Thus the displacement piston 3 continues to be in contact with the wax. During the return movement of the plunger 14, the wax passing through the check valve 5 presses against the front pressure face 13 of the displacement piston 3 and forces the piston 3 back into the starting position without inclusion of air. This measure is ensured by the fact that the displacement piston 3 is dimensioned, in respect to its length, such that upon the total wax displacement from the ejection cylinder 4, the longitudinal groove 10 continue to communicate with the wax outlet opening 9 and by the fact that both piston ring seals 15,16 always lie beyond the feed line 9. Via bores 18, a cavity 19 and a bore passage 20, the wax is kept at the required temperature by warm oil. In addition, an electric jacket heater 21 is also provided for maintaining the wax at the required temperature.

Thus, in accordance with the invention, there is provided a wax cylinder composed of a housing with a displacement piston in the ejection cylinder actuated by a hydraulic cylinder for a wax spraying machine, characterized by a feed line 6 to 9 provided with a check valve 5 in the housing 1, which feed line opens into a longitudinal groove 10 in the displacement piston 3 by a rotation lock, guide rod 11, of the displacement piston 3, and by a feed passage 12 in the displacement piston 3 connected to the longitudinal groove 10 and having an open end in the pressure face 13 of the displacement piston 3. The wax cylinder is further characterized in that the displacement piston 3 is mounted in an overhung position.

The wax cylinder is preferably further characterized in that the stroke of the hydraulic cylinder 2 has the same length as the ejection cylinder 4, and the longitudinal groove 10 likewise has the stroke length and is arranged so that, at total displacement, it is opposite the mouth of the feed line 9 in the housing 1. The wax cylinder is even still further preferably characterized in that the displacement piston 3 slidingly embraces with by a bushing a guide rod 11 dipping from above and fastened in the housing.

The wax cylinder is even further preferably characterized in that the displacement piston 3 is provided at its upper and lower ends with piston rings 15,16 spaced so that during total displacement they lie outside the feed line in the groove 10.

While a specific embodiment of the invention has been shown and described in detail to illustrate the application of the principles of the invention, it will be understood that the invention may be embodied otherwise without departing from such principles.

The embodiments of the invention in which an exclusive property or privilege is claimed are defined as follows:

1. A wax cylinder for a wax spraying machine comprising a housing, an ejection cylinder having a chamber mounted in said housing, an elongated piston slidably mounted in said chamber of said ejection cylinder and having a pressure face, said piston having a longitudinal groove extending therealong and a feed passage extending therethrough from a first end connected to said groove to a second open end in said pressure face for communication with said ejection cylinder chamber, feed line means communicating with said longitudinal groove for passing wax in a feed direction through the housing and the ejection cylinder to said longitudinal groove, a check valve in said feed line means for preventing the return flow of wax opposite the feed direction, means for preventing the rotation of said piston relative to said ejection cylinder in said chamber, means for ejecting wax from said chamber, and means for actuating longitudinal movement of said piston in said chamber to urge said pressure face into engagement with the wax in said chamber, said pressure face being operative responsive to said actuating movement to pressurize the wax for ejection through said ejecting means.

2. A wax cylinder as set forth in claim 1, wherein said displacement piston is mounted in an overhung position.

3. A wax cylinder as set forth in claims 1 or 2, wherein said actuating means comprises a hydraulic cylinder having a stroke, the stroke being of a length equal to the length of said ejection cylinder, and wherein said longitudinal groove has a length equal to the stroke length, and said longitudinal groove being in fluid communication with said feed line means throughout the total displacement of said piston.

4. A wax cylinder as set forth in claim 3, wherein said rotation locking means comprises a rod connected to said housing and extending into a guide opening in said piston.

5. A wax cylinder as set forth in claim 1, further comprising piston rings sealingly engaging said piston to said ejection cylinder at opposite ends of said piston, said piston rings being located on said piston such that said feed line means is communicated with said longitudinal groove at a position intermediate said piston rings through the total displacement of said piston.

6. A wax cylinder as set forth in claim 2, further comprising piston rings sealingly engaging said piston to said ejection cylinder at opposite ends of said piston, said piston rings being located on said piston such that said feed line means is communicated with said longitudinal groove at a position intermediate said piston rings through the total displacement of said piston.

7. A wax cylinder as set forth in claim 3, further comprising piston rings sealingly engaging said piston to said ejection cylinder at opposite ends of said piston, said piston rings being located on said piston such that said feed line means is communicated with said longitudinal groove at a position intermediate said piston rings through the total displacement of said piston.

8. A wax cylinder as set forth in claim 4, further comprising piston rings sealingly engaging said piston to said ejection cylinder at opposite ends of said piston, said piston rings being located on said piston such that said feed line means is communicated with said longitudinal groove at a position intermediate said piston rings through the total displacement of said piston.

9. A wax cylinder as set forth in claim 2, wherein said actuating means comprises a hydraulic cylinder having a stroke, the stroke being of a length equal to the length of said ejection cylinder, and wherein said longitudinal groove has a length equal to the stroke length, and said longitudinal groove being in fluid communication with said feed line means throughout the total displacement of said piston.

10. A wax cylinder as set forth in claim 9, further comprising piston rings sealingly engaging said piston to said ejection cylinder at opposite ends of said piston, said piston rings being located on said piston such that said feed line means is communicated with said longitudinal groove at a position intermediate said piston rings through the total displacement of said piston.

11. A wax cylinder as set forth in claim 10, wherein said longitudinal groove is formed on the outer surface of said piston.

* * * * *